(12) United States Patent
Choe et al.

(10) Patent No.: US 8,983,708 B2
(45) Date of Patent: Mar. 17, 2015

(54) STEERING CONTROL DEVICE OF AUTONOMOUS VEHICLE, AUTONOMOUS VEHICLE HAVING THE SAME AND STEERING CONTROL METHOD OF AUTONOMOUS VEHICLE

(75) Inventors: Tok Son Choe, Daejeon (KR); Yong Woon Park, Daejeon (KR); Jeong Sook Chae, Daejeon (KR)

(73) Assignee: Agency for Defense Development, Daejeon (KR)

( * ) Notice: Subject to any disclaimer, the term of this patent is extended or adjusted under 35 U.S.C. 154(b) by 193 days.

(21) Appl. No.: 13/320,352

(22) PCT Filed: Sep. 28, 2010

(86) PCT No.: PCT/KR2010/006593
§ 371 (c)(1),
(2), (4) Date: Nov. 14, 2011

(87) PCT Pub. No.: WO2011/142508
PCT Pub. Date: Nov. 17, 2011

(65) Prior Publication Data
US 2012/0072075 A1    Mar. 22, 2012

(30) Foreign Application Priority Data
May 11, 2010  (KR) .................. 10-2010-0044148

(51) Int. Cl.
*G05D 1/02* (2006.01)
*B62D 1/28* (2006.01)
*B62D 6/00* (2006.01)

(52) U.S. Cl.
CPC ............. *B62D 1/283* (2013.01); *B62D 6/002* (2013.01); *G05D 1/021* (2013.01); *G05D 2201/0209* (2013.01)
USPC ........................................ 701/25; 701/467

(58) Field of Classification Search
CPC ........................................ G05D 1/021
USPC .............................. 701/25, 26, 467
See application file for complete search history.

(56) References Cited

U.S. PATENT DOCUMENTS 3,994,456 A * 11/1976 Post et al. ............... 244/189
5,341,130 A *  8/1994 Yardley et al. ........... 340/3.1

(Continued)

OTHER PUBLICATIONS

Kelly, Alonzo, "A feedforward control approach to the local navigation problem for autonomous vehicles", CMU-RI-TR-94-17, The Robotics Institute, Carnegie Mellon University, May 2, 1994, 49 pages, downloaded from http://www.frc.ri.cmu.edu/~alonzo/pubs/reports/control.pdf.*

(Continued)

*Primary Examiner* — Behrang Badii
*Assistant Examiner* — David Testardi
(74) *Attorney, Agent, or Firm* — Scully, Scott, Murphy & Presser, P.C.

(57) ABSTRACT

Disclosed are a steering control device of an autonomous vehicle, an autonomous vehicle having the same, and a steering control method of an autonomous vehicle. The steering control method comprises receiving a position of an autonomous vehicle, and a first heading angle of the autonomous vehicle with respect to the north; calculating a second heading angle of the autonomous vehicle toward a tracking waypoint based on the position of the autonomous vehicle, and computing a rotation radius of the autonomous vehicle with respect to the tracking waypoint; calculating a yaw rate based on a speed of the autonomous vehicle and the computed rotation radius, and generating a steering command corresponding to the calculated yaw rate; and compensating for the steering command based on the first and second heading angles.

5 Claims, 9 Drawing Sheets

(56) References Cited

U.S. PATENT DOCUMENTS 5,646,854 A * 7/1997 Bevan .......................... 701/3
2005/0043882 A1 2/2005 Takazawa

OTHER PUBLICATIONS

Jacob, John S. et al., "Conversion and control of an all-terrain vehicle for use as an autonomous mobile robot", Proc. SPIE 3366, Robotic and Semi-Robotic Ground Vehicle Technology, 83, Publication Date: Aug. 12, 1998, 10 pages.*

Helmick, Daniel et al., "Slip-compensated path following for planetary exploration rovers", Advanced Robotics, vol. 20 No. 11, Published 2006, pp. 1257-1280.*

Caravita, Luigi et al., "Control strategies applied to waypoint navigation and obstacle avoidance guidance", International Conference on Advances in Control and Optimizations of Dynamical Systems, Indian Institute of Science, Bangalore, India, ACODS 2007, Feb. 1, 2007, 8 pages.*

Giesbrecht, J. et al. "Path tracking for unmanned ground vehicle navigation", Canada Defence Research and Development Technical Memorandum, DRDC Suffield TM 2005-224, Dec. 2005,36 pages, downloaded from http://cradpdf.drdc-rddc.gc.ca/PDFS/unc45/p524913.pdf.*

Putney, Joseph, "Reactive navigation of an autonomous ground vehicle using dynamic expanding zones", Masters Thesis, Virginia Tech (VPI&SU), May 11, 2006, 113 pages; downloaded from: http://scholar.lib.vt.edu/theses/available/etd-05252006-134900/unrestricted/Joseph_Putney_Thesis_2006_revised.pdf.*

Chosun Ilbo web page, "Korea to develop combat robots", Sep. 21, 2005, downloaded from http://english.chosun.com/site/data/html_dir/2005/09/21/2005092161015.html.*

Faruque, Ruel, "A JAUS Toolkit for LabVIEW, and a Series of Implementation Case Studies with Recommendations to the SAE AS-4 Standards Committee", Masters Thesis, Mechanical Engineering, Virginia Tech, Dec. 8, 2006, 167 pages.*

Jazar, Reza N., Vehicle Dynamics: Theory and Application (Chapter 7: Steering Dynamics), 2008, Springer US, pp. 379-454.*

Touchton, Robert, Planning and modeling extensions to the joint architecture for unmanned systems, SPIE Paper_5804-16, from Proc. SPIE 5804, Unmanned Ground Vehicle Technology VII, 146 (Jun. 2, 2005), 10 pages.*

European Search Report dated Oct. 21, 2013 issued corresponding European Patent Application No. 10851459.7.

* cited by examiner

STEERING CONTROL DEVICE OF AUTONOMOUS VEHICLE, AUTONOMOUS VEHICLE HAVING THE SAME AND STEERING CONTROL METHOD OF AUTONOMOUS VEHICLE

TECHNICAL FIELD

The present invention relates to a steering control device of an autonomous vehicle and a steering control method, and particularly, to a steering control device of an autonomous vehicle capable of tracking a waypoint (route point) of an autonomous vehicle, an autonomous vehicle having the same, and a steering control method of an autonomous vehicle.

BACKGROUND ART

As the most advanced scientific technology develops, various techniques are applied to military fields. Especially, developments of sensors and computer hardware enable an unmanned combat system.

Concerning technology developments in the field of an unmanned combat system, an autonomous vehicle performs supervising Reconnaissance, Surveillance and Target Acquisition (RSTA), commands and controls, explosive detections and removals, and so on. As a system of an individual autonomous vehicle is interworked with a wideband communication network, a plurality of autonomous vehicles systematically perform several functions at visible or invisible circumstances.

For driving toward a waypoint, the autonomous vehicle receives waypoints transmitted from a command and control vehicle or a portable control device thus to select the next traceable waypoint, and generates a steering command for tracking the selected next waypoint.

Generally, a steering command is generated by the two methods. One is model approach, and another is learning approach. The model approach is a method for controlling a speed and steering by using a dynamic model of a platform, and the learning approach is a method for controlling a speed and steering by performing specific learning offline. The specific learning is carried out by utilizing the output speed and information of a steering value with respect to an input speed, a steering command, information of attitude state, and information of the road surface state obtained through many experiments using a learning method such as a neural network.

A function of steering control based on the model approach is much influenced by the accuracy of a model. For real-time control, the model is simplified by linearization in this model approach. This may deteriorate reliability and stability when the model approach is applied to a real autonomous vehicle. Furthermore, the model approach may deteriorate a waypoint tracking performance when the surrounding circumstances change.

On the other hand, steering control based on the learning approach is more practical with respect to learned circumstances, but does not guarantee its performance with respect to non-learned circumstances.

DISCLOSURE OF INVENTION

Technical Problem

Therefore, it is an object of the present invention to provide a steering control device of an autonomous vehicle which generates real-time steering commands, an autonomous vehicle having the same, and a steering control method of an autonomous vehicle.

Another object of the present invention is to provide a steering control device of an autonomous vehicle capable of autonomously adapting to the changes of peripheral circumstances, an autonomous vehicle having the same, and a steering control method of an autonomous vehicle.

Solution to Problem

To achieve these and other advantages and in accordance with the purpose of the present invention, as embodied and broadly described herein, there is provided a steering control method of an autonomous vehicle, the method comprising: receiving a position of an autonomous vehicle, and a first heading angle of the autonomous vehicle with respect to the north; calculating a second heading angle of the autonomous vehicle toward a tracking waypoint based on the position of the autonomous vehicle, and computing a rotation radius of the autonomous vehicle with respect to the tracking waypoint; calculating a yaw rate based on a speed of the autonomous vehicle and the computed rotation radius, and generating a steering command corresponding to the calculated yaw rate; and compensating for the steering command based on the first and second heading angles.

According to one embodiment of the present invention, the step of generating a steering command may be a step of generating a steering command corresponding to the calculated yaw rate based on a preset characteristic formula. The characteristic formula may be a polynomial expression having the steering command and the yaw rate as an independent variable and a dependent variable, respectively. A coefficient of the polynomial expression may be calculated based on an output yaw rate measured on a road surface of a specific condition with respect to a steering command having undergone a sampling process within a predetermined range.

According to another embodiment of the present invention, the steering control method may further comprise changing the preset characteristic formula into a specific ratio when the steering command or the compensated steering command corresponds to a maximum value within the predetermined range, in correspondence to a condition of a road surface on which the autonomous vehicle runs.

According to another embodiment of the present invention, the step of changing may include a detecting step and an updating step. In the detecting step, a current steering command may be detected, and the current steering command may be compared with the maximum value within the predetermined range thereby detecting a maximum yaw rate corresponding to the maximum value. In the updating step, the preset characteristic formula may be updated based on the maximum yaw rate, and a maximum output yaw rate obtained when the steering command having undergone a sampling process is maximized.

According to another embodiment of the present invention, the steering control method may further comprise increasing or decreasing the steering command by a specific ratio in correspondence to a condition of a road surface on which the autonomous vehicle runs. The step of generating a steering command may generate a steering command corresponding to the calculated yaw rate based on a preset polynomial expression, and the step of increasing or decreasing the steering command may be implemented by the coefficient of the polynomial expression with a specific ratio. The polynomial expression may be set based on a steering command having undergone a sampling process, and an output yaw rate of the autonomous vehicle outputted in a specific state by the steering command having undergone a sampling process. And, the specific ratio may be a ratio between a maximum output yaw rate corresponding to a maximum value of the steering command having undergone a sampling process, and a maximum yaw rate corresponding to a maximum vale of the steering command.

According to another embodiment of the present invention, the step of compensating may include adding a value obtained by multiplying a difference between the first and second heading angles by a preset gain in the steering command. The rotation radius may be a radius of a circular arc formed by connecting the autonomous vehicle to the tracking waypoint.

To achieve these and other advantages and in accordance with the purpose of the present invention, as embodied and broadly described herein, a steering control device of an autonomous vehicle is also provided, the device is composed of as follows: a waypoint selection unit for selecting a tracking waypoint of an autonomous vehicle based on a current position of the autonomous vehicle with using received waypoints; a computation unit for calculating a second heading angle of the autonomous vehicle toward the tracking waypoint based on the position of the autonomous vehicle, and computing a rotation radius of the autonomous vehicle with respect to the tracking waypoint; and a steering command generation unit for calculating a yaw rate based on a speed of the autonomous vehicle and the computed rotation radius, generating a steering command corresponding to the calculated yaw rate, and compensating for the steering command based on the second heading angle, and a first heading angle of the autonomous vehicle with respect to the north.

To achieve these and other advantages and in accordance with the purpose of the present invention, as embodied and broadly described herein, an autonomous vehicle having the steering control device is still also provided, the autonomous vehicle is composed of as follows: a body configured to autonomously move and mounted with a driving means; a receiver for obtaining a position of the body, a first heading angle of the body with respect to the north, and waypoints; the steering control device for selecting one of the waypoints as a tracking waypoint based on the position of the body, and generating a steering command such that the body tracks the tracking waypoint; and a driving controller for receiving the steering command, and controlling the driving means according to the received steering command.

Advantageous Effects of Invention

The present invention may have the following advantageous effects.

Firstly, since the autonomous vehicle may be controlled by steering command based on yaw rate information of a navigation device and computations using the yaw rate information, it may be economical. Further, real-time characteristic may be implemented due to a small amount of computations.

Secondly, an output yaw rate with respect to a normalized input steering command may be measured, a characteristic formula may be obtained based on the measured output yaw rate and then a steering command may be generated based on the characteristic formula. This may simplify the modeling of a characteristic formula suitable to the variation of road surface and vehicle dynamic characteristics.

Thirdly, a preset characteristic formula may be changed by utilizing maximum yaw rate information with respect to a maximum steering command which has been real-time obtained. This may prevent a decline of a waypoint tracking function due to changes of a road surface on which the autonomous vehicle runs.

BEST MODE FOR CARRYING OUT THE INVENTION

Figure 1:
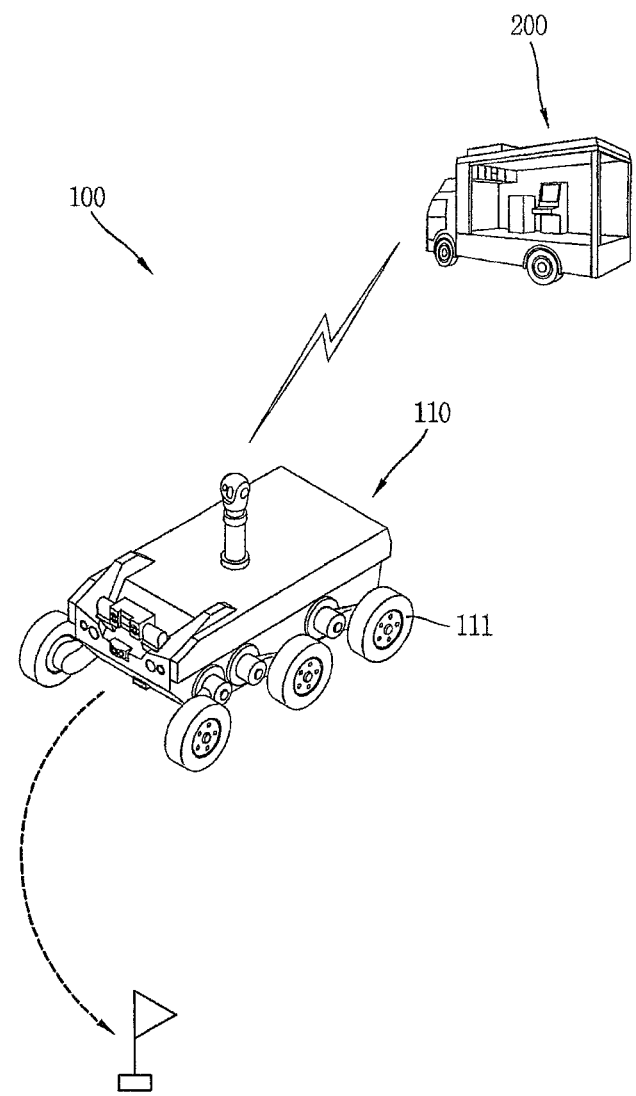
FIG. 1 is a perspective view of an autonomous vehicle according to a first embodiment of the present invention.

Reference will now be made in detail to the preferred embodiments of the present invention, examples of which are illustrated in the accompanying drawings.

Hereinafter, a steering control device of an autonomous vehicle, an autonomous vehicle having the same, and a steering control method of an autonomous vehicle according to the present invention will be explained in more detail. The same or similar components of one embodiment as or to those of another embodiment will be provided with the same or similar reference numerals, and their detailed explanations will be omitted. A singular expression includes a plural concept unless there is a contextually distinctive difference therebetween.

Figure 2:
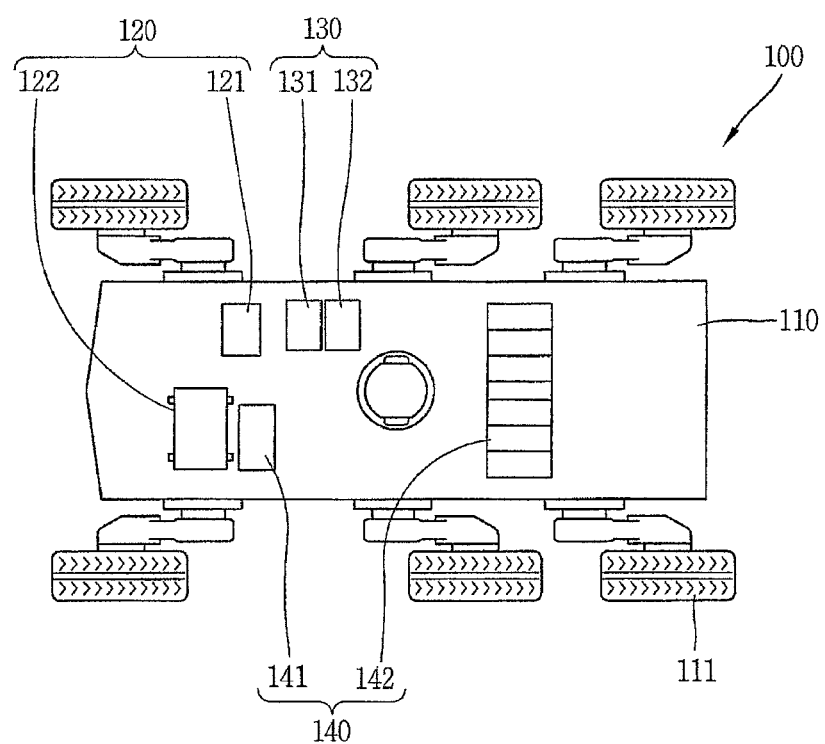
FIG. 2 is a configuration view of hardware of the autonomous vehicle of FIG. 1.
Figure 3:
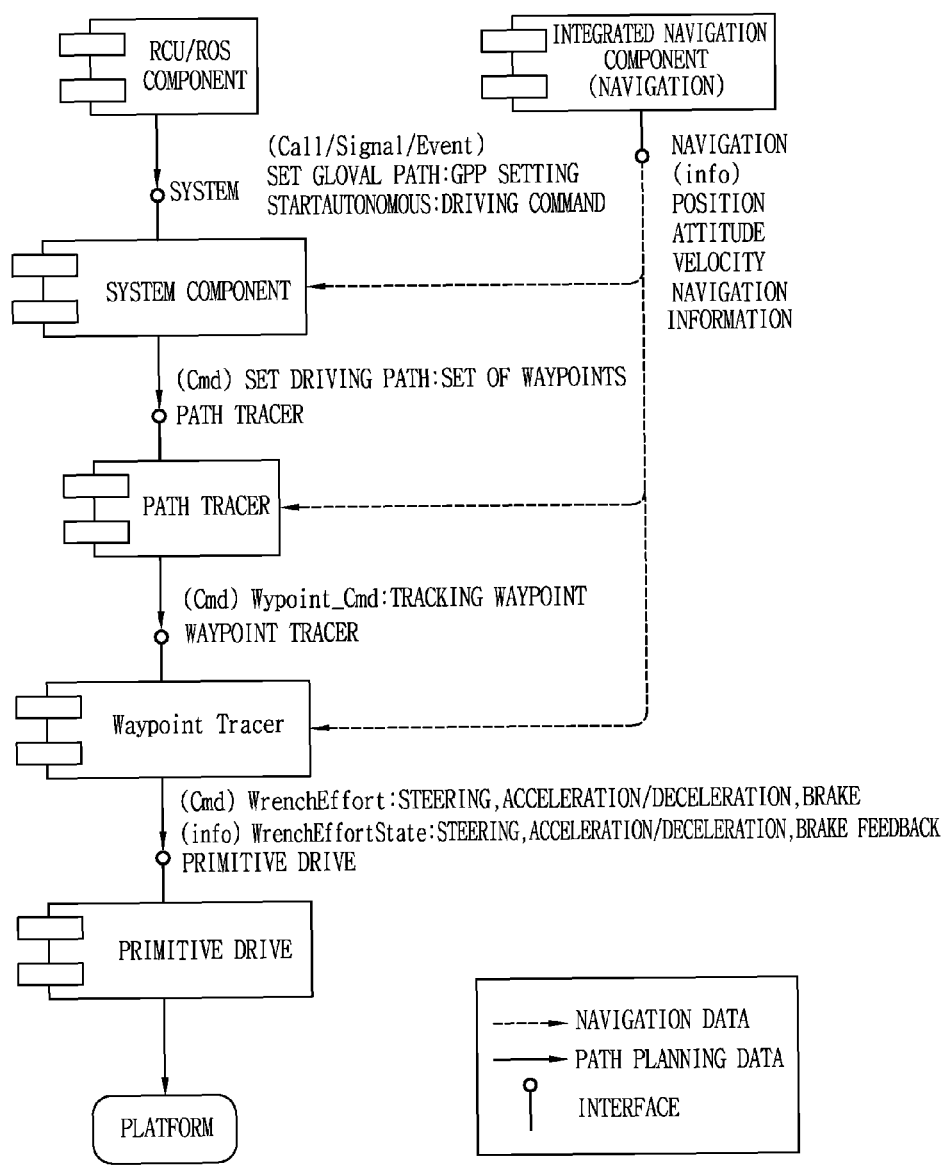
FIG. 3 is a configuration view of software of the autonomous vehicle of FIG. 1.

FIG. 1 is a perspective view of an autonomous vehicle according to a first embodiment of the present invention, FIG. 2 is a configuration view of a hardware of the autonomous vehicle of FIG. 1, and FIG. 3 is a configuration view of a software of the autonomous vehicle of FIG. 1.

Referring to FIGS. 1 and 2, an autonomous vehicle 100 comprises a body 110, a receiver 120, a steering control device 130, and a driving controller 140.

The body 110 is configured to autonomously move. For instance, the autonomous vehicle 100 is configured to spontaneously generate an autonomous navigation command by utilizing a received control command or information acquired by a sensor. The autonomous driving indicates a driving method for driving the body 110 of the autonomous vehicle 100 while the autonomous vehicle 100 spontaneously generates a control command by a preset control algorithm.

A driving means is mounted to the body 110. For instance, the autonomous vehicle 100 is provided with a plurality of wheels 111 for moving on the road surface. The body 110 is connected to a wheel arm so that the autonomous vehicle 100 can run on a field or a rough terrain.

The receiver 120 for receiving each kind of information is mounted to the body 110. The receiver 120 includes a sensor 121 for sensing position information, and a wireless communication device 122 for transmitting or receiving a signal to/from a remote controller 200. The remote controller 200 may be a remote operation station of a command and control vehicle, or a portable control device.

The sensor 121 may be a navigation sensor for acquiring a position of the body 110 and a first heading angle of the body 110 with respect to the north. The position of the body 110 may be a coordinate value on an absolute coordinate system, and the first heading angle may be an angle formed between the north and a moving direction of the body 110.

The wireless communication device 122 may be mounted in the body 110 in the form of an electronic component for wireless communications. The autonomous vehicle 100 receives a set of waypoints from the remote controller 200 by wireless communications. A Remote Operation Station (ROS) component or a Remote Control Unit (RCU) component may be mounted to a remote operation station or a portable control device.

The steering control device 130 selects one of received waypoints as a tracking waypoint based on the position of the body 110, and generates a steering command so that the body 110 can trace the tracking waypoint.

The steering control device 130 includes an integrated processing computer 131 and an autonomous control computer 132. Referring to FIGS. 2 and 3, a set of waypoints and a speed command received from the wireless communication device 122 are transmitted to the integrated processing computer 131 through a Giga LAN switch, and are processed by a system component of the integrated processing computer.

The integrated processing computer 131 transmits the set of waypoints and speed command to the autonomous control computer 132 through a Giga LAN switch. Three software components of the autonomous control computer 132 may be operated.

One of the three software components is a Path Tracer for selecting a next waypoint that can be tracked by the autonomous vehicle, from the received set of waypoints, based on a current position of the autonomous vehicle. Another of the three software components is a Waypoint Tracer for generating steering and speed commands for tracking the next waypoint generated by the Path Tracer. The other of the three software components is a Primitive Driver for transmitting steering and acceleration/deceleration commands generated by the Waypoint Tracer to the integrated processing computer through a Giga LAN.

The driving controller 140 is configured to receive a steering command, and controls a driving means of the body 110 by the received steering command.

The driving controller 140 may include an integrated driving controller 141 and an integrated servo controller 142, and the integrated servo controller 142 may be provided with six wheel/arm servo controllers.

For instance, the integrated processing computer 131 transmits steering and speed commands to the integrated driving controller 141 through a CAN, and the integrated driving controller 141 transmits a torque command to the six wheel/arm servo controllers of the integrated servo controller 142 so as to execute the generated steering and speed commands.

Hereinafter, a steering control method of the autonomous vehicle will be explained with reference to FIGS. 4 to 6.

Figure 4:
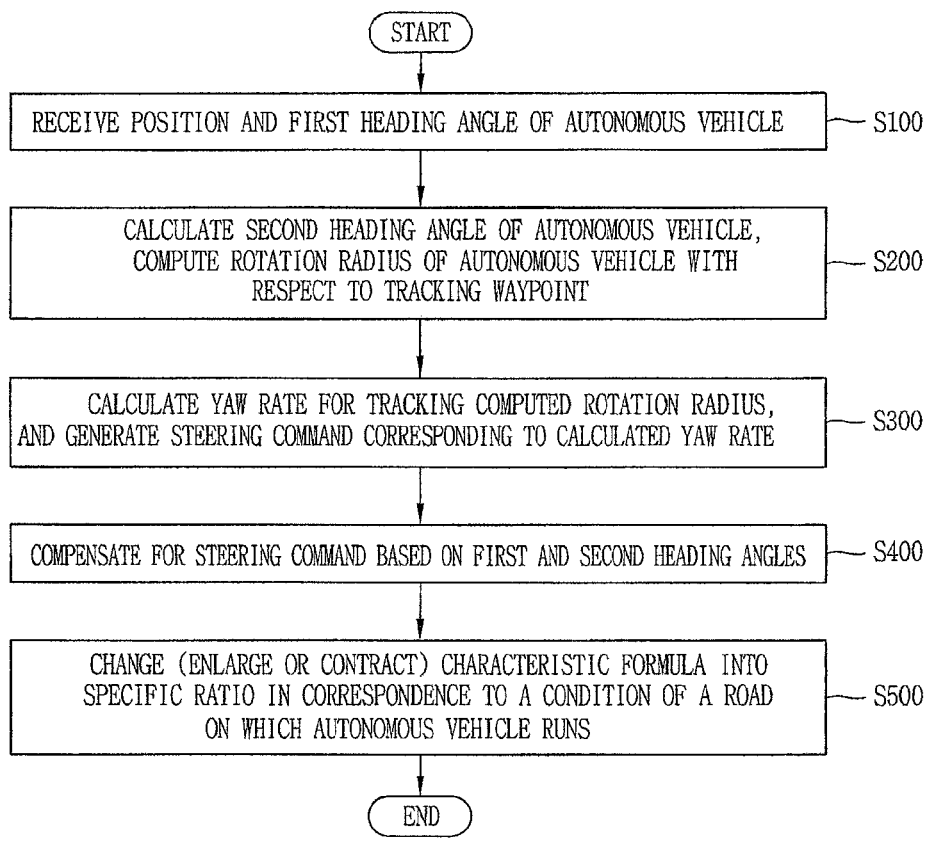
FIG. 4 is a flowchart showing a steering control method of an autonomous vehicle according to the present invention.
Figure 5:
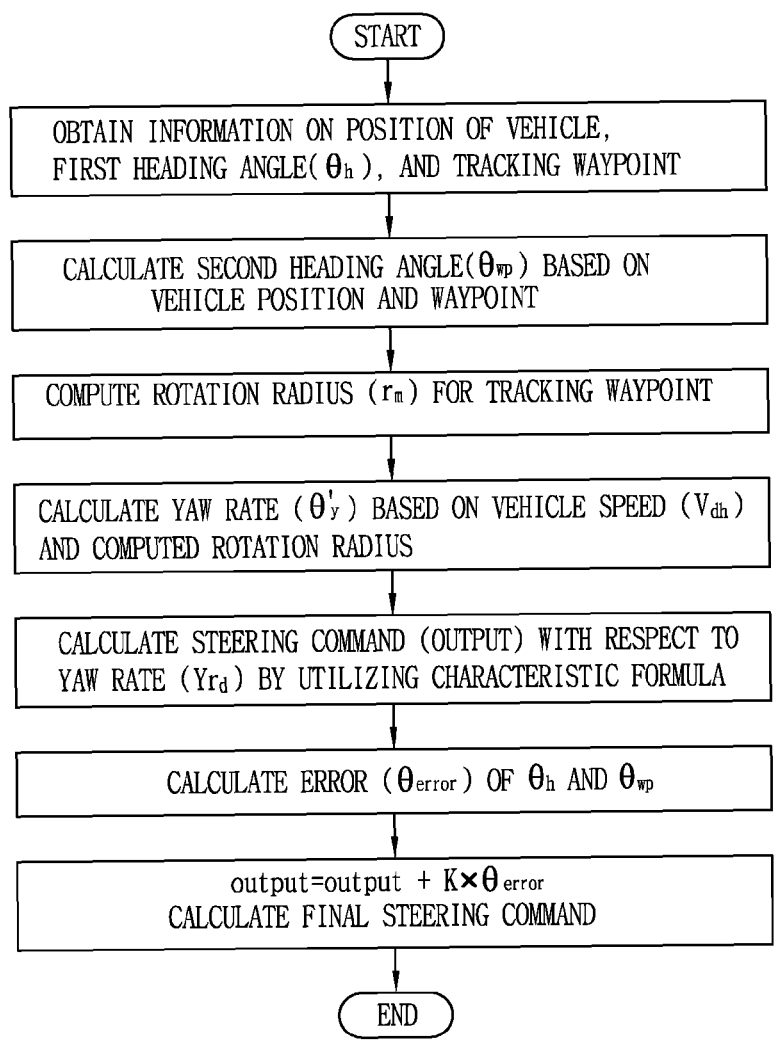
FIG. 5 is a flow chart showing a basic control method of FIG. 4 with details.
Figure 6:
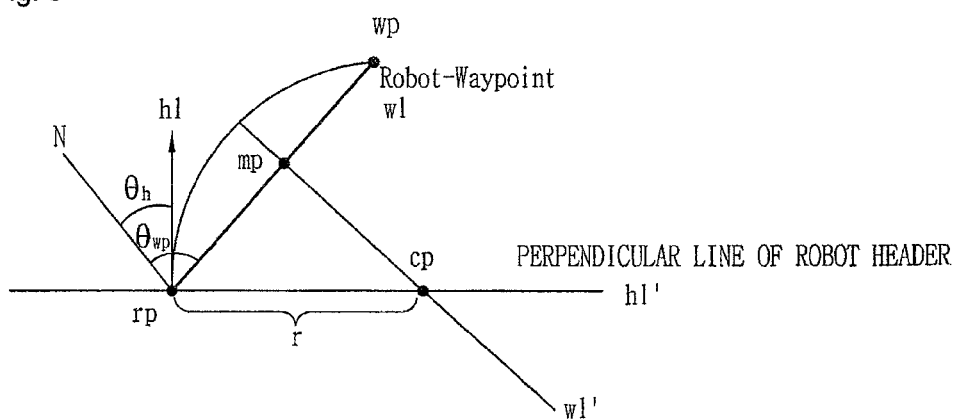
FIG. 6 is a conceptual view for calculation of a rotation radius and a heading angle.

FIG. 4 is a flowchart showing a steering control method of the autonomous vehicle according to the present invention, FIG. 5 is a flow chart showing a basic control method of FIG. 4 with details, and FIG. 6 is a conceptual view for calculation of a rotation radius and a heading angle.

Referring to FIG. 4, the steering control method of the autonomous vehicle includes a basic control method, and selectively includes an adaptive control method. The basic control method includes a receiving step (S100), a calculating step (S200), a generating step (S300), and a compensating step (S400).

Referring to FIGS. 4 and 5, a position of the autonomous vehicle, and a first heading angle of the autonomous vehicle with respect to the north are received (S100). For instance, a position of the autonomous vehicle, and a first heading angle of the autonomous vehicle with respect to the true north on an absolute coordinate system are received through a navigation sensor. Referring to FIG. 6, the first heading angle (θh) is defined as an angle between a heading direction (hl) of the autonomous vehicle and the true north (N).

In the receiving step (S100), a set of waypoints is received from the steering control device, and a tracking waypoint is selected from the waypoints.

In the calculating step (S200), a second heading angle of the autonomous vehicle toward the tracking waypoint is calculated based on a position of the autonomous vehicle, and a rotation radius of the autonomous vehicle with respect to the tracking waypoint is computed. Referring to FIG. 6, the second heading angle (θwp) is defined as an angle between a direction toward the tracking waypoint (line connecting 'rp' and 'wp') and the true north (N).

The rotation radius is defined as a radius of a circular arc formed by connecting the autonomous vehicle to the tracking waypoint. In the drawing, "rp" indicates a position of the autonomous vehicle, "hl" indicates a heading direction of the autonomous vehicle, "wp" indicates a next tracking waypoint, and "hl'" indicates a normal perpendicular to the "hl". If a line passing through a midpoint of a line connecting the "rp" and the "wp" and perpendicular to the line is formed, "cp", a point contacting the "hl'" serves as a center of a rotation radius for tracking a waypoint by the autonomous vehicle. Accordingly, the rotation radius is computed as "r", a distance between the "rp" and the "cp".

Referring to FIGS. 4 and 5 back, in the generating step (S300), a yaw rate for tracking the rotation radius is calculated based on a speed of the autonomous vehicle and the computed rotation radius, and a steering command corresponding to the calculated yaw rate is generated.

A yaw rate for tracking the rotation radius (rm) is calculated based on a current speed (Vdh) of the autonomous vehicle as the following formula (1).

[Formula 1]

$$\theta'_y = V_{dh}/r_m \qquad (1)$$

The generating step (S300) may be a step of generating a steering command corresponding to the calculated yaw rate based on a preset characteristic formula.

The characteristic formula is a polynomial expression having the steering command as a dependant variable and the yaw rate as an independent variable, respectively. A coefficient of the polynomial expression is calculated based on an output yaw rate measured on a road surface of a specific condition with respect to a steering command, which steering command has undergone a sampling process within a predetermined range.

The polynomial expression is set based on a steering command which has undergone A sampling process, and an input yaw rate of the autonomous vehicle generated in a specific state by the steering command having undergone a sampling process. For instance, the polynomial expression may be a formula with respect to an input yaw rate generated with respect to a normalized input steering command (−100%~100%) of the autonomous vehicle. The polynomial expression is obtained by measuring yaw rates which are in a normal state with respect to inputted steering commands which commands have undergone sampling processes with 10%, 20%, 30%, 40%, 50%, 60%, 70%, 80%, 90% and 100%. The normal state indicates that the autonomous vehicle runs with a constant speed, a road surface has a constant type with the same humidity, etc.

The measured value of the yaw rates is approximated in the form of a polynomial expression. According to experiments, an autonomous vehicle such as a dog-horse robot has a minimized error when the measured value is approximated into a cubic equation. Therefore, a characteristic formula is approximated into the following formula (2).

[Formula 2]

$$\text{output} = f(\theta') = c3 \cdot \theta'^3 + c2 \cdot \theta'^2 + c1 \cdot \theta' \qquad (2)$$

Referring to the Formula (2), c3, c2, c1 indicate coefficients of a cubic equation, $\theta'$ indicates a yaw rate, and an output is a normalized steering command. A constant is fixed to '0' so that a steering command can be '0' when a requested yaw rate is '0'.

Finally, the steering command is compensated based on the first and second heading angles (S400).

The compensating step (S400) may be a step of adding, to the steering command, a value obtained by multiplying a difference between the first and second heading angles by a preset gain (K). Accordingly, a final steering command reflecting an error ($\theta$error) between the first and second heading angles is defined as the following formula (3).

[Formula 3]

$$\text{output} = \text{output} + K \cdot \theta_{error} \qquad (3)$$

The final steering command is followed by a precise control result with respect to the autonomous vehicle of a normal state. Hereinafter, will be explained an adaptive control method having higher adaptability when a speed, a type of a road surface, and a state are changed. The adaptive control method is configured so as to increase or decrease coefficients of the characteristic formula.

Figure 7:
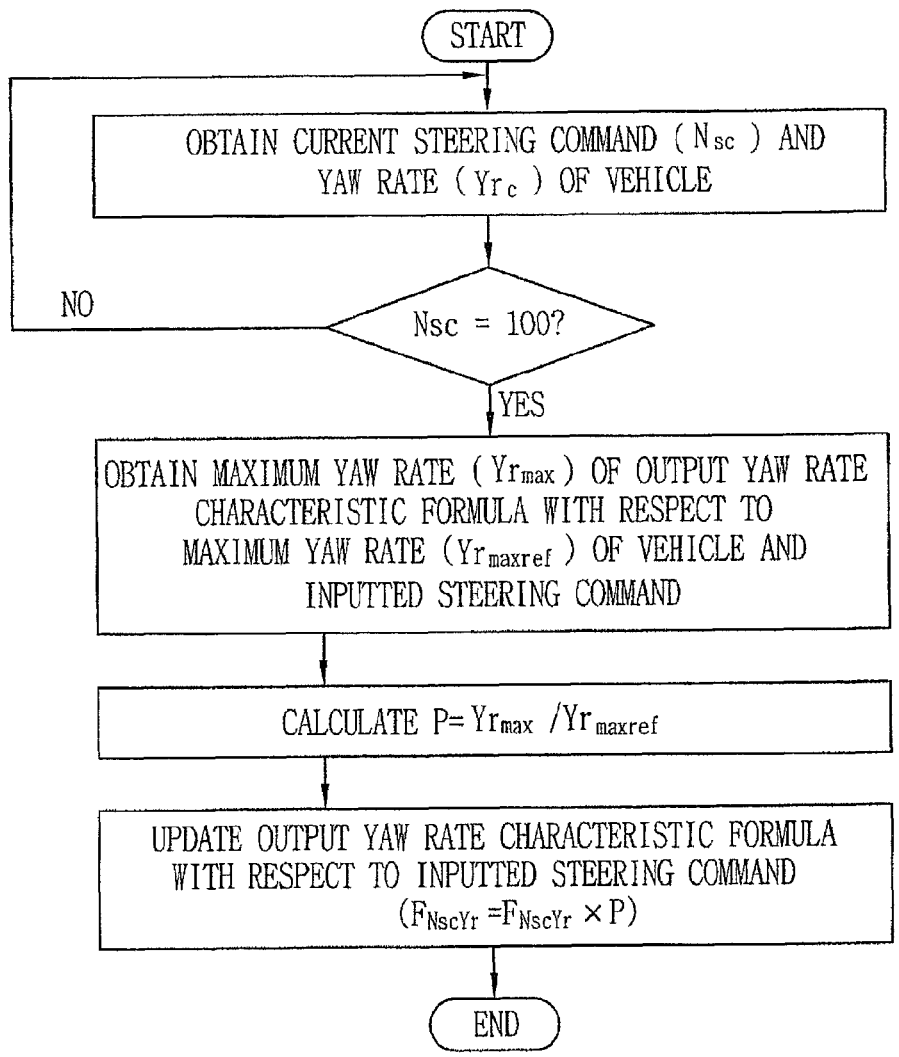
FIG. 7 is a flow chart showing an adaptive control method of FIG. 4 with details.
Figure 8:
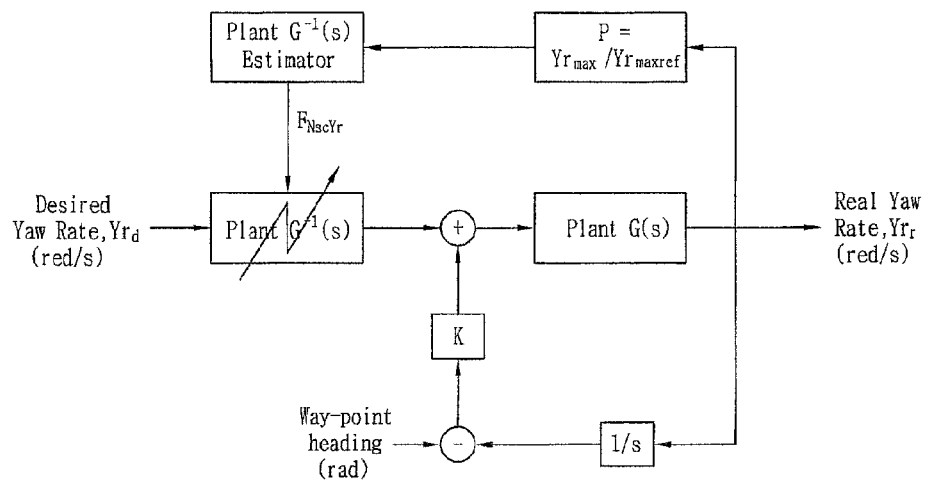
FIG. 8 is a block diagram of the adaptive control method of FIG. 7.

FIG. 7 is a flow chart showing an adaptive control method of FIG. 4 with details, and FIG. 8 is a block diagram of the adaptive control method of FIG. 7.

Referring to FIG. 4, an adaptive control method is added to a step subsequent to the compensating step (S400) of the basic control method.

The adaptive control method comprises a changing step (S500) for changing the preset characteristic formula into a specific ratio when the steering command or the compensated steering command corresponds to a maximum value within a predetermined range, in correspondence to a condition of a road surface on which the autonomous vehicle runs.

More concretely, the changing step (S500) includes a detecting step and an updating step.

In the detecting step, a current steering command is detected; and the current steering command is compared with the maximum value within the predetermined range. Accordingly, a maximum yaw rate corresponding to the maximum value is detected.

In the updating step, the preset characteristic formula is updated based on the maximum yaw rate and a maximum output yaw rate. The maximum output yar rate is obtained when the steering command, which has undergone a sampling process, is maximized.

Referring to FIGS. 7 and 8, the changing step may be a step of enlarging or contracting the steering command into a specific ratio, in correspondence to a condition of a road surface on which the autonomous vehicle runs. That is, a coefficient of a polynomial expression is enlarged or contracted into a specific ratio.

Referring to the drawings, the specific ratio may be a ratio (P) between a maximum output yaw rate ($\theta'$maxref) corresponding to a maximum value of the steering command having undergone a sampling process, and a maximum yaw rate ($\theta'$max) corresponding to a maximum value of the steering command. The ratio (P) is expressed as the following formula (4).

[Formula 4]

$$P = \theta'_{max\,ref} / \theta'_{max} \qquad (4)$$

The ratio (P) is multiplied by a coefficient of a characteristic formula ($f_{N_{sc}Y_r}$). As a result, enlarging or contracting the characteristic formula for adaptation to the road surface can be carried out, and a final steering command can be calculated. This will be expressed as the following formula (5).

[Formula 5]

$$f_{N_{sc}Y_r}(\theta'_y) = P \cdot f_{N_{sc}Y_r}(\theta'_y) \qquad (5)$$

Referring to FIG. 8, a Plant (G) of an adaptive control method is defined as a vehicle system having a normalized steering command as an input and having a yaw rate as an output. A Plant (G-1) is a system having a relation characteristic formula ($f_{N_{sc}Y_r}$) of a requested steering command with respect to a specific yaw rate obtained by measuring an output yaw rate with respect to a normalized steering command previously measured with respect to any vehicle system, a standard road surface and a fixed speed.

The characteristic formula obtained by measurements has a structure to decrease an error through controls using a difference between a desired heading and a heading of a substantial vehicle. The characteristic formula is changed with respect to the road surface by a Plant (G-1) Estimator through a ratio between a maximum yaw rate of a standard characteristic formula obtained by measurements, and a maximum yaw rate of a substantial vehicle obtained with respect to a maximum steering command, which are updated by the Plant (G-1).

Figure 9:
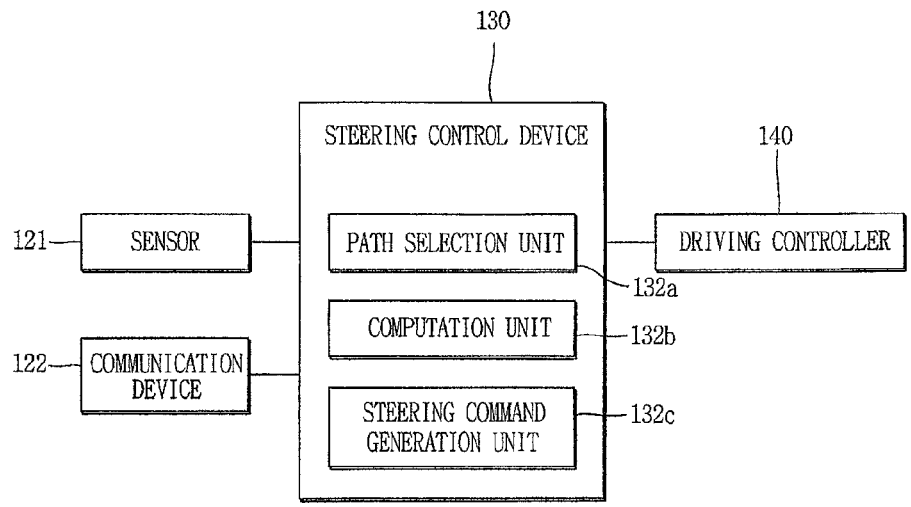
FIG. 9 is a block diagram showing a detailed structure of a steering control device of the autonomous vehicle of FIG. 2.

Hereinafter, a steering control device of an autonomous vehicle implemented by the steering control method will be explained with reference to FIG. 9. FIG. 9 is a block diagram showing a detailed structure of a steering control device of the autonomous vehicle of FIG. 2.

The steering control device 130 calculates a second heading angle of a tracking waypoint and a rotation radius of an autonomous vehicle based on a position of the autonomous vehicle, and calculates a yaw rate based on a speed of the autonomous vehicle and the computed rotation radius. The yaw rate may become a control parameter which enables the autonomous vehicle to track the rotation radius.

And, the steering control device 130 generates a steering command corresponding to the calculated yaw rate, and compensates for the generated steering command based on the first and second heading angles.

The steering control device 130 includes a waypoint selection unit 132a, a computation unit 132b, and a steering command generation unit 132c. The waypoint selection unit 132a, the computation unit 132b, and the steering command generation unit 132c may constitute an autonomous control computer 132 (refer to FIG. 2).

The waypoint selection unit 132a selects a tracking waypoint of the autonomous vehicle based on a current position of the autonomous vehicle with using received waypoints. The computation unit 132b calculates a second heading angle of the autonomous vehicle toward the tracking waypoint based on the position of the autonomous vehicle, and computes a rotation radius of the autonomous vehicle with respect to the tracking waypoint.

And, the steering command generation unit 132c calculates a yaw rate which enables the autonomous vehicle to track the rotation radius based on a speed of the autonomous vehicle and the computed rotation radius, generates a steering command corresponding to the calculated yaw rate, and compensates for the steering command based on the second heading angle, and the first heading angle of the autonomous vehicle with respect to the north.

The steering command is generated by using a preset characteristic formula, and the characteristic formula is a polynomial expression having the steering command and the yaw rate as an independent variable and a dependent variable, respectively. A coefficient of the polynomial expression is calculated based on an output yaw rate measured on a road surface of a specific condition with respect to a steering command having undergone a sampling process within a predetermined range.

The steering command generation unit 132c changes the preset characteristic formula into a specific ratio when the steering command or the compensated steering command corresponds to a maximum value within the predetermined range, in correspondence to a condition of a road surface on which the autonomous vehicle runs.

The characteristic formula and the specific ratio used by the steering command generation unit can be explained in more detail in the steering control method aforementioned with reference to FIGS. 4 to 8.

Hereinafter, the fact that a characteristic formula adaptive to a type or a state change of a road surface is implemented by enlarging or contracting a characteristic formula of an output yaw rate will be explained by comparing characteristic formulas of the autonomous vehicle with respect to the lawn and the field with each other.

Figure 10:
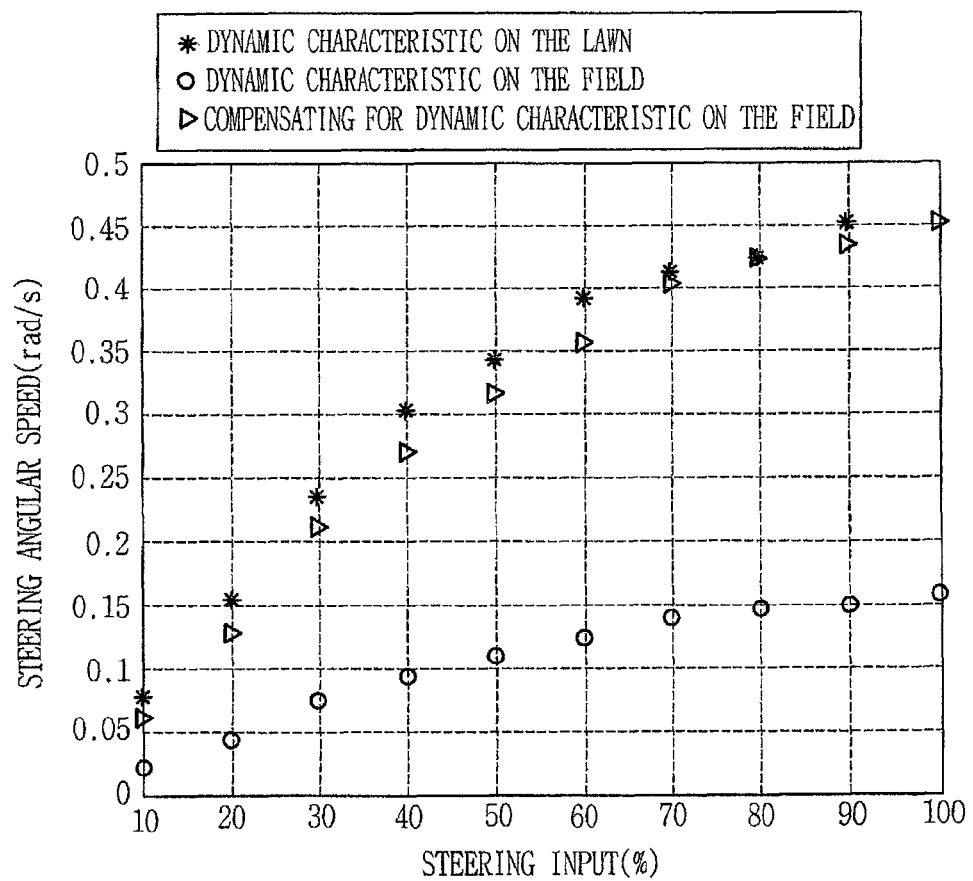
FIG. 10 is a graph showing a pattern of a characteristic formula of an autonomous vehicle.

FIG. 10 is a graph showing a pattern of a characteristic formula of the autonomous vehicle.

A road surface of the field has a partial uneven ground, and has small grass and tall grass. And, a road surface of the lawn has a comparatively uniform lawn and a flat surface.

The graph of FIG. 10 indicates a steering angular speed with respect to a steering input. Here, the sign of '*' indicates a characteristic of an output yaw rate with respect to a normalized input steering command in the lawn, and the sign of 'o' indicates a characteristic of an output yaw rate with respect to a normalized input steering command in the field. And, the sign of 'Δ' indicates a graph obtained by multiplying the graph of the field by the ratio of the formula (4). It can be seen from the graph that a characteristic formula is changed according to a type or a state of the road surface. Here, a pattern of the characteristic formula is not changed, but the characteristic formula is changed to be enlarged or contracted based on a reference characteristic formula.

The steering control device of an autonomous vehicle, the autonomous vehicle having the same, and the steering control method of an autonomous vehicle have industrial applicability.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

Steering control device of autonomous vehicle, autonomous vehicle having the same and steering control method of autonomous vehicle may be industrially applicable.

The invention claimed is:

1. A steering control method of an autonomous vehicle, the method comprising:
    receiving, using a sensor, a position of an autonomous vehicle, and a first heading angle of the autonomous vehicle with respect to north;
    calculating a second heading angle of the autonomous vehicle toward a tracking waypoint based on the position of the autonomous vehicle;
    computing a rotation radius of the autonomous vehicle with respect to the tracking waypoint;
    calculating a yaw rate based on a speed of the autonomous vehicle and the computed rotation radius;
    generating a steering command corresponding to the calculated yaw rate;
    compensating for the steering command based on the first and second heading angles; and
    controlling the autonomous vehicle with the compensated steering command;
    wherein the step of generating a steering command comprises a step of generating a steering command corresponding to the calculated yaw rate based on a preset characteristic formula that has the form output=$f(\theta')$, where $\theta'$ is the calculated yaw rate and output is the steering command;
    wherein the characteristic formula comprises a polynomial expression and has a single independent variable and a single dependent variable that functionally relate to a value of the steering command and a value of the calculated yaw rate; and
    wherein the polynomial expression has at least one coefficient and the coefficient is calculated based on output yaw rates measured on a road surface with respect to additional steering commands.

2. The method of claim 1, wherein the step of compensating is a step of adding, to the steering command, a value obtained by multiplying a difference between the first and second heading angles by a preset gain.

3. The method of claim 1, wherein the rotation radius is a radius of a circular arc formed by connecting the autonomous vehicle to the tracking waypoint.

4. A steering control device of an autonomous vehicle, the device comprising:
    a waypoint selection unit for selecting a tracking waypoint of an autonomous vehicle based on a current position of the autonomous vehicle with using received waypoints;
    a computation unit for calculating a second heading angle of the autonomous vehicle toward the tracking waypoint based on the position of the autonomous vehicle, and computing a rotation radius of the autonomous vehicle with respect to the tracking waypoint; and
    a steering command generation unit for calculating a yaw rate based on a speed of the autonomous vehicle and the computed rotation radius, generating a steering command for controlling the autonomous vehicle corresponding to the calculated yaw rate, and compensating for the steering command based on the second heading angle, and a first heading angle of the autonomous vehicle with respect to north, wherein the steering command is generated by a preset characteristic formula that has the form output=f(θ'), where θ' is the calculated yaw rate and output is the steering command;

wherein the characteristic formula comprises a polynomial expression and has a single independent variable and a single dependent variable that functionally relate to a value of the steering command and a value of the calculated yaw rate; and wherein the polynomial expression has at least one coefficient and the coefficient is calculated based on output yaw rates measured on a road surface with respect to additional steering commands.

5. An autonomous vehicle, comprising:

a body configured to autonomously move and mounted with a driving means;

a receiver for receiving a position of the body, a first heading angle of the body with respect to north, and waypoints;

a steering control device for selecting one of the waypoints as a tracking waypoint based on the position of the body, and generating a steering command such that the body tracks the tracking waypoint; and a driving controller for receiving the steering command, and controlling the driving means according to the received steering command, wherein the steering control device calculates a second heading angle of the autonomous vehicle toward the tracking waypoint based on the position of the autonomous vehicle, and computes a rotation radius of the autonomous vehicle, wherein the steering control device calculates a yaw rate based on a speed of the autonomous vehicle and the computed rotation radius, and generates a steering command for controlling the autonomous vehicle corresponding to the calculated yaw rate, wherein the steering control device compensates for the generated steering command based on the first and second heading angles, and wherein the steering command is generated by a preset characteristic formula that has the form output=f(θ'), where θ' is the calculated yaw rate and output is the steering command;

wherein the characteristic formula comprises a polynomial expression and has a single independent variable and a single dependent variable that functionally relate to a value of the steering command and a value of the calculated yaw rate; and wherein the polynomial expression has at least one coefficient and the coefficient is calculated based on output yaw rates measured on a road surface with respect to additional steering commands.

* * * * *